(12) United States Patent
Yokota et al.

(10) Patent No.: US 11,312,654 B2
(45) Date of Patent: Apr. 26, 2022

(54) COMPOSITION FOR GLASS FIBER, GLASS FIBER, GLASS-FIBER-CONTAINING COMPOSITE MATERIAL CONTAINING GLASS FIBER, AND METHOD FOR MANUFACTURING GLASS FIBER

(71) Applicant: Nippon Electric Glass Co., Ltd., Shiga (JP)

(72) Inventors: Yuki Yokota, Shiga (JP); Toshikatsu Tanaka, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 216 days.

(21) Appl. No.: 16/473,395

(22) PCT Filed: Nov. 16, 2017

(86) PCT No.: PCT/JP2017/041235
§ 371 (c)(1),
(2) Date: Jun. 25, 2019

(87) PCT Pub. No.: WO2018/123328
PCT Pub. Date: Jul. 5, 2018

(65) Prior Publication Data
US 2020/0148586 A1 May 14, 2020

(30) Foreign Application Priority Data

Dec. 28, 2016 (JP) .............................. JP2016-254843

(51) Int. Cl.
| C03C 3/091 | (2006.01) |
| C03C 13/00 | (2006.01) |
| C03C 3/087 | (2006.01) |
| C04B 14/42 | (2006.01) |
| C03B 37/08 | (2006.01) |

(52) U.S. Cl.
CPC .............. *C03C 13/00* (2013.01); *C03C 3/087* (2013.01); *C03C 3/091* (2013.01); *C04B 14/42* (2013.01); *C03B 37/08* (2013.01); *C03C 2213/00* (2013.01)

(58) Field of Classification Search
CPC ......... C03C 3/087; C03C 3/091; C03C 13/00; C03C 13/06; C03C 2213/00; C04B 14/42; C03B 37/08
See application file for complete search history.

(56) References Cited

U.S. PATENT DOCUMENTS

| 6,284,684 | B1 | 9/2001 | Vignesoult et al. |
| 6,313,050 | B1 | 11/2001 | De Meringo et al. |
| 2003/0181306 | A1 | 9/2003 | Bernard et al. |
| 2005/0031703 | A1 | 2/2005 | Beier et al. |
| 2005/0085369 | A1 | 4/2005 | Jensen |
| 2007/0087139 | A1 | 4/2007 | Creux et al. |
| 2008/0009403 | A1 | 1/2008 | Hofmann et al. |
| 2011/0003678 | A1 | 1/2011 | Hofmann et al. |
| 2011/0039681 | A1 | 2/2011 | Lecomte |
| 2012/0135849 | A1 | 5/2012 | Hoffman et al. |
| 2013/0203583 | A1 | 8/2013 | Zhang et al. |
| 2014/0357469 | A1 | 12/2014 | Beaufils et al. |
| 2015/0259240 | A1 | 9/2015 | Zhang et al. |
| 2016/0326045 | A1* | 11/2016 | Li .......................... C03C 3/095 |
| 2017/0066683 | A1 | 3/2017 | Lecomte et al. |
| 2017/0226003 | A1 | 8/2017 | Nonaka et al. |

FOREIGN PATENT DOCUMENTS

| CN | 101580344 | 11/2009 | |
| CN | 101580344 A | * 11/2009 | ............. C03C 13/00 |
| CN | 101691278 | 4/2010 | |
| CN | 102015563 | 4/2011 | |
| CN | 103596897 | 2/2014 | |
| CN | 104066688 | 9/2014 | |
| CN | 104944772 | 9/2015 | |
| EP | 2354106 | 8/2011 | |
| JP | 5-279072 | 10/1993 | |
| JP | 7-215729 | 8/1995 | |
| JP | 9-142871 | 6/1997 | |
| JP | 2001-180969 | 7/2001 | |
| JP | 2002-512937 | 5/2002 | |
| JP | 2002-513730 | 5/2002 | |
| JP | 2002-526364 | 8/2002 | |
| JP | 2003-527287 | 9/2003 | |
| JP | 2005-511471 | 4/2005 | |
| JP | 2005-525985 | 9/2005 | |
| JP | 2006-527158 | 11/2006 | |

(Continued)

OTHER PUBLICATIONS

K. L. Loewenstein, The Manufacturing Technology of Continuous Glass Fibers, 1993, Elsevier, 3rd Edition, pp. 47, 48, and 117-234 (Year: 1993).*
International Preliminary Report on Patentability and Written Opinion of the International Searching Authority dated Jul. 2, 2019 in International (PCT) Application No. PCT/JP2017/041235.
International Search Report dated Jan. 16, 2018 in International Application No. PCT/JP2017/041235.

(Continued)

*Primary Examiner* — Elizabeth A. Bolden
(74) *Attorney, Agent, or Firm* — Wenderoth, Lind & Ponack, L.L.P.

(57) ABSTRACT

Provided is a composition for a glass fiber which has a high elastic modulus and satisfactory productivity, and can facilitate the production of a fine-count glass fiber. The composition for a glass fiber of the present invention includes, as a glass composition expressed as a mass percent in terms of oxide, 50% to 70% of $SiO_2$, 15% to 25% of $Al_2O_3$, 3% to 13% of MgO, 3% to 15% of CaO, and 0.5% to 5% of $B_2O_3$.

11 Claims, No Drawings

(56) References Cited

FOREIGN PATENT DOCUMENTS

| | | | | |
|---|---|---|---|---|
| JP | 2007-217192 | 8/2007 | | |
| JP | 2009-514773 | 4/2009 | | |
| JP | 2013-500939 | 1/2013 | | |
| JP | 2015-6973 | 1/2015 | | |
| JP | 5988013 B1 * | 9/2016 | ............. | C03C 3/091 |
| NZ | 502123 | 12/2001 | | |
| WO | 2012/087313 | 6/2012 | | |
| WO | 2012/104999 | 8/2012 | | |
| WO | 2016/203676 | 12/2016 | | |

OTHER PUBLICATIONS

Extended European Search Report dated Jul. 24, 2020 in corresponding European Patent Application No. 17887890.6.
Office Action dated Oct. 18, 2021 in corresponding Chinese Patent Application No. 201780077755.3, with English-language translation of the Search Report.

* cited by examiner

COMPOSITION FOR GLASS FIBER, GLASS FIBER, GLASS-FIBER-CONTAINING COMPOSITE MATERIAL CONTAINING GLASS FIBER, AND METHOD FOR MANUFACTURING GLASS FIBER

TECHNICAL FIELD

The present invention relates to a composition for a glass fiber and a glass fiber, a glass-fiber-containing composite material including a glass fiber, and a method of producing a glass fiber.

BACKGROUND ART

A glass fiber (also referred to as "glass filament") has been produced by continuously forming (spinning) molten glass into a fiber shape with a forming apparatus called a bushing apparatus (also referred to as "platinum heating vessel") generally having a substantially rectangular appearance. The bushing apparatus, which is arranged in the bottom portion of a pot-shaped vessel having a function of temporarily retaining the molten glass, is formed of a heat-resistant metal material, such as platinum, and includes many nozzle portions (or orifice portions). Temperature control is performed with the bushing apparatus so that the temperature of the molten glass may be an optimum temperature at the tip of each of the bushing nozzles, specifically, the temperature at which its viscosity at high temperature corresponds to $10^3$ dPa·s. Then, the molten glass is continuously flowed out of the bushing nozzle and quenched to be formed (spun) as the glass fiber.

In the case where the forming of the glass fiber is performed, when the liquidus temperature Ty of the molten glass becomes equal to or more than the forming temperature Tx of the glass (the temperature at which the viscosity at high temperature of the glass corresponds to 10 dPa·s), a crystal serving as a cause for devitrification is liable to deposit in the molten glass in a vicinity portion of the bushing nozzle. As a result, the bushing nozzle clogs to be responsible for yarn breakage also referred to as "break". Accordingly, the liquidus temperature Ty of the molten glass needs to be lower than the forming temperature Tx (i.e., a temperature difference ΔTxy=Tx−Ty>0), and the temperature difference ΔTxy is preferably as large as possible. In the case where the forming temperature Tx is increased, the temperature difference (ΔTxy) between the forming temperature and the liquidus temperature Ty of the molten glass increases. In this case, however, the following problem occurs. An increase in production cost for the glass fiber due to an increase in energy needed for the melting of the glass is caused, or the lifetime of an incidental facility, such as the bushing apparatus, is shortened. Accordingly, the forming temperature Tx is preferably reduced.

As described above, in the production of the glass fiber, the control of the forming temperature Tx and the temperature difference ΔTxy is extremely important. Meanwhile, however, the high functionalization of a glass-fiber-containing composite material has been required, and hence there has been a growing demand for a glass fiber that is more excellent in elastic modulus. An S-glass formed of a glass composition including $SiO_2$, $Al_2O_3$, and MgO, or an R-glass formed of a glass composition including $SiO_2$, $Al_2O_3$, MgO, and CaO has been known as a glass for a glass fiber having such characteristic. However, any such glass has involved a problem in terms of productivity because its forming temperature Tx is high and its temperature difference ΔTxy is small.

In view of the foregoing, in Patent Literature 1, as a novel high-modulus glass intended to improve a fiber formation temperature (i.e., the forming temperature Tx) and a ΔT (i.e., the temperature difference ΔTxy), there is a disclosure of a composition for a glass fiber in which the contents of $SiO_2$ and $Al_2O_3$, and the content of, for example, an alkaline earth metal or alkali metal oxide typified by MgO or CaO are regulated.

In addition, as a further requirement, there has also been a growing demand for a fine-count glass fiber product as an application to be utilized in a functional member requiring fine structure control. In, for example, a printed wiring board, a conduction hole (referred to as, for example, "via hole", "via", "through-hole", "inner via hole", "blind via hole", or "via hole") having a diameter of 0.1 mm or less, the conduction hole connecting arbitrary conductor layers arranged through intermediation of an insulating substrate, needs to be formed by drilling or laser processing, and a fine-count glass fiber is preferably used for subjecting the substrate to such high-precision processing.

In order to spin a fine-count glass fiber, the diameter of a nozzle of a bushing only needs to be made smaller. However, as the diameter is made smaller, the following problem occurs. A problem, such as the creep deformation of the nozzle, is liable to occur, and hence the patience time of the base plate of the bushing shortens. In order to avoid such problem, in Patent Literature 2, Patent Literature 3, or the like, the shape of the bushing or the nozzle is limited. In addition, in the forming of the glass fiber with such bushing as described above, it is important to prevent the clogging of the nozzle because the clogging leads to the breakage of the fiber, thereby reducing a product yield. In view of the foregoing, in Patent Literature 4, a dam for preventing heterogeneous foreign matter or the like from flowing into the nozzle is arranged.

CITATION LIST

Patent Literature

Patent Literature 1: JP 2009-514773 A
Patent Literature 2: JP 05-279072 A
Patent Literature 3: JP 07-215729 A
Patent Literature 4: JP 09-142871 A

SUMMARY OF INVENTION

Technical Problem

However, in the glass fiber disclosed in Patent Literature 1, a composition for a glass fiber in which the fiber formation temperature (i.e., the forming temperature Tx) is low and the ΔT (the temperature difference ΔTxy) is large is not present, and hence it may be difficult to correspond to the production of a fine-count glass fiber. Further, it cannot be necessarily said that the elastic modulus of the glass fiber obtained in Patent Literature 1 is sufficiently high.

In addition, when a facility is changed for corresponding to a fine count, such a problem in terms of production as described below that has not heretofore been assumed newly occurs. For example, when the diameter of a bushing nozzle is made smaller, the lifetime of the facility shortens. Moreover, even foreign matter having fine dimensions or the devitrification of molten glass, which has not heretofore been perceived as a problem, is responsible for yarn breakage.

An object of the present invention is to provide a composition for a glass fiber and a glass fiber each of which has a high elastic modulus and satisfactory productivity, and can facilitate the production of a fine-count glass fiber, a glass-fiber-containing composite material comprising a glass fiber, and a method of producing a glass fiber.

Solution to Problem

According to one embodiment of the present invention, there is provided a composition for a glass fiber, comprising, as a glass composition expressed as a mass percent in terms of oxide, 50% to 70% of $SiO_2$, 15% to 25% of $Al_2O_3$, 3% to 13% of MgO, 3% to 15% of CaO, and 0.5% to 5% of $B_2O_3$. With this, a composition for a glass fiber which has a high elastic modulus and satisfactory productivity, and can facilitate the production of a fine-count glass fiber can be obtained.

It is preferred that the composition for a glass fiber according to the embodiment of the present invention have a temperature difference $\Delta Txy$ between a forming temperature Tx and a liquidus temperature Ty of 90° C. or more. With this, the temperature difference $\Delta Txy$ is large, and hence a composition for a glass fiber that has particularly satisfactory productivity and can facilitate the production of a fine-count glass fiber can be obtained. The forming temperature Tx refers to the temperature at which the viscosity at high temperature of molten glass corresponds to $10^3$ dPa·s. The liquidus temperature Ty was determined by: loading glass powder that had passed through a standard 30-mesh sieve and had remained on a standard 50-mesh sieve (300 μm) into a vessel made of platinum; then holding the powder in a temperature gradient furnace for 16 hours; and specifying the deposition temperature of a crystal. In addition, the temperature difference $\Delta Txy$ was determined by calculating a difference between the forming temperature Tx and the liquidus temperature Ty.

It is preferred that the composition for a glass fiber according to the embodiment of the present invention have a forming temperature Tx of 1,365° C. or less. With this, fiber formation can be performed at low temperature. Accordingly, the lifetime of a fiber-forming facility, such as a bushing, can be lengthened, and hence a production cost for a glass fiber can be reduced.

It is preferred that the composition for a glass fiber according to the embodiment of the present invention have an elastic modulus E of 90 GPa or more. With this, a glass-fiber-containing composite material that shows small strain with respect to a stress and has a high physical strength can be obtained.

It is preferred that the composition for a glass fiber according to the embodiment of the present invention have a linear thermal expansion coefficient α of $45\times10^{-7}$/° C. or less. With this, a thermal stress can be reduced even under a high-temperature environment, and hence the heat resistance of the glass-fiber-containing composite material can be improved. The linear thermal expansion coefficient α is an average thermal expansion coefficient in the temperature range of from 30° C. to 380° C.

According to one embodiment of the present invention, there is provided a glass fiber, comprising 95 mass % or more of glass formed of the composition for a glass fiber according to the above-mentioned embodiment of the present invention in terms of solid content. With this, a glass fiber having a high elastic modulus can be obtained. Further, its productivity is satisfactory, and hence a large amount of glass fibers can be continuously produced. In addition, a fine-count glass fiber can be easily produced. The solid content is calculated by: measuring the mass of the glass fiber under a state in which the glass fiber is dried so that a moisture content on the surface of the glass fiber may be less than 0.1%; subjecting the glass fiber to superheat treatment to heat and remove organic matter applied to the surface of the glass fiber; and then measuring the mass of the residue.

It is preferred that a product form of the glass fiber according to the embodiment of the present invention comprise any one of a chopped strand, a yarn, and a roving.

According to one embodiment of the present invention, there is provided a glass-fiber-containing composite material, which is obtained by compositing the glass fiber according to the above-mentioned embodiment of the present invention with an organic medium, concrete, or mortar. With this, the composite material can be used in a wide variety of applications.

According to one embodiment of the present invention, there is provided a method of producing a glass fiber, comprising forming glass formed of a composition for a glass fiber having the glass composition and/or the characteristics described above into a fiber shape. With this, a high-modulus glass fiber can be stably provided because a glass fiber having a high elastic modulus and satisfactory productivity can be obtained, and a fine-count glass fiber can be easily produced.

It is preferred that, in the method of producing a glass fiber according to the above-mentioned embodiment of the present invention, the forming be performed with a bushing apparatus.

It is preferred that, in the method of producing a glass fiber according to the above-mentioned embodiment of the present invention, the forming be performed while a forming temperature Tx is measured and controlled in a range of ±20° C. with respect to a target temperature. With this, the control of the amount of molten glass flowing out of a bushing nozzle is facilitated, and hence the production of the glass fiber is further stabilized.

DESCRIPTION OF EMBODIMENTS

The glass composition of a composition for a glass fiber of the present invention is described in detail below. In the following description, the expression "%" means "mass %" unless otherwise stated.

$SiO_2$ is a main component that forms the skeleton structure of glass. In addition, $SiO_2$ is a component that improves the mechanical strength of the glass and the acid resistance of the glass. Meanwhile, a case in which the content of $SiO_2$ is excessively large is not preferred because the viscosity of molten glass becomes so high that it becomes difficult to bring the molten glass into a homogeneous molten state, and as a result, it becomes difficult to adjust the diameter of a glass fiber. In addition, when the viscosity is high, energy needed for melting the glass increases. In addition, the forming temperature Tx of the glass increases, and hence the damage of a bushing made of a precious metal becomes severer to increase the frequency at which the bushing is replaced with a new one. Thus, a production cost for the glass fiber increases. Accordingly, the content of $SiO_2$ is from 50% to 70%, preferably from 50% to 65%, more preferably from 55% to 65%.

$Al_2O_3$ is a component that improves the chemical durability and mechanical strength of the glass, and is a component that improves the elastic modulus E of the glass. When the content of $Al_2O_3$ is 15% or more, the mechanical strength of the glass is improved, and hence a large improving effect on the elastic modulus E of the glass is exhibited. Meanwhile, the incorporation of an appropriate amount of $Al_2O_3$ into the glass exhibits a suppressing effect on the deposition of a crystal and the generation of phase separation in the molten glass, but the incorporation of a large amount thereof is liable to produce a devitrified crystal of mullite ($3Al_2O_3 \cdot 2SiO_2$) containing $Al_2O_3$ as a main component in the molten glass. In addition, when the content of $Al_2O$ is excessively large, the viscosity of the molten glass becomes so high that it becomes difficult to bring the molten glass into a homogeneous molten state, and as a result, it becomes difficult to adjust the diameter of the glass fiber. In addition, the energy needed for melting the glass increases. In addition, the forming temperature Tx increases, and hence the damage of the bushing made of a precious metal becomes severer to increase the frequency at which the bushing is replaced with a new one. Thus, the production cost increases. Accordingly, the content of $Al_2O_3$ is from 15% to 25%, preferably from 16% to 24%, more preferably from 18% to 24%, still more preferably from 19% to 24%, particularly preferably from 21% to 23%.

MgO is a component that has a function as a melting accelerate component that facilitates the melting of a glass raw material, and has a function of reducing a viscosity at the time of the melting of the glass to accelerate bubble breaking, thereby reducing the forming temperature Tx. In addition, MgO is a component that has a function of improving the mechanical strength of the glass to improve the elastic modulus E. Meanwhile, when the content of MgO is excessively large, in glass composition having a large $Al_2O_3$ content, a devitrified crystal of cordierite ($2MgO \cdot 2Al_2O_3 \cdot 5SiO_2$) is liable to deposit from the molten glass, and is responsible for the clogging of a nozzle of the bushing at the time of the forming of the glass fiber in some cases. Moreover, the linear thermal expansion coefficient $\alpha$ of the glass increases. Accordingly, the content of MgO is from 3% to 13%, preferably from 5% to 12%, more preferably from 6% to 12%, still more preferably from 7% to 12%, particularly preferably from 8% to 11%.

As in the MgO component, CaO is a component that has a function as a melting accelerate component that facilitates the melting of the glass raw material, and is a component that reduces the viscosity at the time of the melting of the glass to accelerate the bubble breaking, thereby reducing the forming temperature Tx at the time of the forming of the glass fiber. In addition, CaO is a component that improves the mechanical strength of the glass to improve the elastic modulus E of the glass. Meanwhile, when a large amount of CaO is incorporated into the glass, a devitrified crystal of wollastonite ($CaO \cdot SiO_2$) is liable to deposit from the molten glass. Moreover, the linear thermal expansion coefficient $\alpha$ increases. Accordingly, the content of CaO is from 3% to 15%, preferably from 5% to 13%, more preferably from 8% to 12%.

$B_2O_3$ is a component that forms a skeleton in a glass network structure as in $SiO_2$, and is a component that has functions of: reducing the viscosity of the glass to accelerate the bubble breaking; reducing the melting temperature and forming temperature Tx of the glass; and improving the meltability of the glass. In addition, $B_2O_3$ can reduce the liquidus temperature Ty of the glass to increase a temperature difference $\Delta Txy$ between the Tx and the Ty because $B_2O_3$ can significantly suppress the production of the devitrified crystals of mullite ($3Al_2O_3 \cdot 2SiO_2$), cordierite ($2MgO \cdot 2Al_2O_3 \cdot 5SiO_2$), and wollastonite ($CaO \cdot SiO_2$). As a result, the productivity of the glass fiber can be made satisfactory, and a fine-count glass fiber can be easily produced. Meanwhile, when the content of $B_2O_3$ in the glass composition becomes excessively large, the amount of evaporation of a boron component increases during the melting, and hence it becomes difficult to keep the molten glass in a homogeneous state in some cases. In addition, when the content of the $B_2O_3$ component becomes excessively large, in the case where the composition is used in a printed wiring board, the composition is susceptible to the moisture of a surrounding environment, and hence boron, an alkali, or the like may be eluted from the glass composition under a high-humidity environment to cause the impairment of the electrical reliability of the printed wiring board, such as a reduction in electrical insulation property thereof. Accordingly, the content of $B_2O_3$ is from 0.5% to 5%, preferably from 0.8% to 4.5%, more preferably from 1% to 4%, still more preferably from 1.5% to 4%.

In the composition for a glass fiber of the present invention, the incorporation of $B_2O_3$ as an essential component into the glass composition can increase the content of a component that is liable to deposit a devitrified crystal but contributes to an improvement in elastic modulus, such as $Al_2O_3$, MgO, or CaO. With this, the elastic modulus E of the glass to be obtained can be improved while satisfactory productivity of the glass fiber is maintained. Accordingly, the content "$Al_2O_3$+MgO+CaO" (the total content of $Al_2O_3$, MgO, and CaO) is preferably from 35% to 53%, more preferably from 36% to 50%, still more preferably from 37% to 49%, particularly preferably from 38% to 48%.

In addition, in the composition for a glass fiber of the present invention, both the satisfactory productivity and the high elastic modulus of the glass can be achieved by regulating the ratio of the total content of $Al_2O_3$, MgO, and CaO to the content of $B_2O_3$. That is, the value of the ratio "($Al_2O_3$+MgO+CaO)/$B_2O_3$" is preferably from 6.5 to 106, more preferably from 7 to 100, still more preferably from 8 to 90, particularly preferably from 9 to 80, most preferably from 10 to 70 in terms of mass ratio.

The composition for a glass fiber of the present invention may comprise a component except the above-mentioned components ($SiO_2$, $Al_2O_3$, MgO, CaO, and $B_2O_3$). However, the composition is desirably regulated so that the total content of the above-mentioned components may be 97% or more, 98% or more, or, in particular, 99% or more. The reason for the foregoing is as follows: when the total content of those components is less than 97%, an inconvenience, such as reductions in characteristics as a product due to a reduction in alkali resistance, acid resistance, or water resistance of the composition, or a reduction in productivity due to a reduction in difference between the forming temperature and the liquidus temperature, is liable to occur owing to the inclusion of an unintended dissimilar component.

In addition to the foregoing, the content of alkali metal oxides (the total content of $Li_2O$+$Na_2O$+$K_2O$) is preferably reduced because of the following reason, though the alkali metal oxides each have an effect of reducing the viscosity of the glass to accelerate the bubble breaking: when the content becomes excessively large, in the case where the composition for a glass fiber is turned into a glass-fiber-containing composite material, there is a problem in that it becomes difficult to maintain its strength with time. Accordingly, the content of the alkali metal oxides is preferably from 0% to 3%, more preferably from 0% to 2%, still more preferably from 0% to 1%, particularly preferably from 0% to 0.6%.

When a high-purity raw material configuration of a chemical product is adopted, such composition substantially free of the alkali metal oxides as described in the foregoing can be obtained. However, as long as stable quality can be secured even when a natural raw material comprising the alkali metal oxides is used, a content of 0.4% or more, or, moreover, 0.5% or more may be permitted.

In addition, $TiO_2$ is a component that improves the elastic modulus E of the glass, and has a function of reducing the deposition temperature of the devitrified crystal of mullite $(3Al_2O_3.2SiO_2)$ or cordierite $(2MgO.2Al_2O_3.5SiO_2)$ in a $SiO_2$—$Al_2O_3$—MgO composition system. Meanwhile, a case in which a large amount of the $TiO_2$ component is incorporated into the glass is not preferred because a $TiO_2$-based crystal is liable to deposit from the molten glass. Accordingly, the content of $TiO_2$ is from 0% to 3%, preferably from 0.1% to 2%, more preferably from 0.3% to 1%.

In addition, $ZrO_2$ is a component that improves the elastic modulus E of the glass as in the $TiO_2$ component. However, $ZrO_2$ may increase the deposition temperature of the devitrified crystal of mullite $(3Al_2O_3.2SiO_2)$ or cordierite $(2MgO.2Al_2O_3.5SiO_2)$ in the glass melt of a $SiO_2$—$Al_2O_3$—MgO composition system, and is hence a component whose content should be limited. Accordingly, the content of $ZrO_2$ is from 0% to 3%, preferably from 0% to 2%, more preferably from 0% to 1%.

In addition, an arbitrary one kind, or arbitrary two or more kinds selected from $SnO_2$, $As_2O_3$, $Sb_2O_3$, $F_2$, $CeO_2$, $SO_3$, and $Cl_2$ may be incorporated into the glass for the purpose of improving its fining property. The content of each of the components is from 0% to 2%, preferably from 0% to 1%, more preferably from 0% to 0.8%.

In order to improve the meltability, the alkali resistance, the acid resistance, the water resistance, the forming temperature, and the liquidus temperature, a component except the above-mentioned components, such as SrO, BaO, ZnO, $P_2O_5$, $Fe_2O_3$, $Cr_2O_3$, MnO, $La_2O_3$, $WO_3$, $Nb_2O_5$, or $Y_2O_3$, may be incorporated in an appropriate amount as required, and each of the components may be incorporated at up to 3% into the glass.

Further, each of, for example, Hz, $O_2$, $CO_2$, CO, $H_2O$, He, Ne, Ar, and $N_2$ may be incorporated at up to 0.5% into the glass. In addition, a precious metal element, such as Pt, Rh, or Au, may be incorporated at up to 500 ppm into the glass.

The characteristics of the composition for a glass fiber of the present invention, and a glass fiber and a glass-fiber-containing composite material of the present invention are described below.

In the composition for a glass fiber of the present invention, the temperature difference $\Delta Txy$ between the forming temperature Tx and the liquidus temperature Ty is preferably 90° C. or more, more preferably 95° C. or more, still more preferably 100° C. or more, particularly preferably 110° C. or more, most preferably 115° C. or more. When the temperature difference $\Delta Txy$ is increased, the productivity of the glass fiber can be made satisfactory, and the composition can easily correspond to the production of a fine-count glass fiber.

In the composition for a glass fiber of the present invention, the forming temperature Tx is preferably 1,365° C. or less, more preferably 1,360° C. or less, still more preferably 1,355° C. or less, particularly preferably 1,350° C. or less, most preferably 1,345° C. or less. With this, the composition can be produced at low temperature, and hence a production cost therefor can be reduced.

In the composition for a glass fiber of the present invention, the liquidus temperature Ty is preferably 1,300° C. or less, more preferably 1,280° C. or less, still more preferably 1,270° C. or less, particularly preferably 1,260° C. or less, most preferably 1,250° C. or less. With this, the temperature difference $\Delta Txy$ is easily increased, and hence the productivity can be made satisfactory and the composition can easily correspond to the production of a fine-count glass fiber.

In the composition for a glass fiber of the present invention, the elastic modulus E is preferably 90 GPa or more, more preferably 90.5 GPa or more, still more preferably 91 GPa or more, particularly preferably 92 GPa or more, most preferably 93 GPa or more. With this, a high-modulus glass fiber can be obtained. As a result, a glass-fiber-containing composite material that shows small strain with respect to a stress and has a high physical strength can be obtained. In addition, when the composition is used as a printed wiring board, the elasticity of a glass fiber to be used as a reinforcing material can be improved, and hence the warping of the printed wiring board can be reduced.

In the composition for a glass fiber of the present invention, the linear thermal expansion coefficient $\alpha$ is preferably $45\times10^{-7}/°$ C. or less, more preferably $44.5\times10^{-7}/°$ C. or less, still more preferably $44\times10^{-7}/°$ C. or less, particularly preferably $43.5\times10^{-7}/°$ C. or less. With this, a thermal stress can be reduced even under a high-temperature environment, and hence a glass fiber resistant to thermal impact can be obtained. As a result, the heat resistance of the glass-fiber-containing composite material can be improved.

The glass fiber of the present invention comprises 95% or more of glass formed of the composition for a glass fiber described above in terms of solid content. When 95% or more of the glass fiber of the present invention is the glass formed of the composition for a glass fiber described above, and the balance is organic matter, such as a coating agent, a flaw hardly occurs on the surface of the glass fiber in various processing steps, such as a step of weaving the glass fiber, and hence stable strength performance can be maintained. In addition, the glass fiber can sufficiently exhibit various kinds of physical and chemical performance. The content of the glass formed of the composition for a glass fiber in the glass fiber of the present invention is from 95% to 100%, preferably from 95.5% to less than 100%, more preferably from 96% to 99.99%, still more preferably from 96.5% to less than 99.99% in terms of solid content. Here, the solid content is calculated by: measuring the mass of the glass fiber under a state in which the glass fiber is dried so that a moisture content on the surface of the glass fiber may be less than 0.1%; subjecting the glass fiber to superheat treatment to heat and remove the organic matter applied to the surface of the glass fiber; and then measuring the mass of the residue.

A case in which the content of the glass formed of the composition for a glass fiber is less than 95% in terms of solid content is not economical because of the following reason: the protective performance of the organic matter applied to the surface on the glass fiber is not further improved, and the amount of the organic matter needed for the application increases, and hence a production cost for the glass fiber increases. In addition, when the content of the glass formed of the composition for a glass fiber expressed as a mass percent in terms of solid content is more than 99.99%, the protective performance on the surface of the glass fiber is not sufficiently exhibited in some cases.

In addition, the shape of a fiber section of the glass fiber of the present invention vertical to a drawing direction at the time of its spinning may be any one of irregular sectional shapes, such as an ellipse, a track shape, a flat shape, a rectangular shape, a cocoon shape, and a polygon, in addition to a circular shape.

In addition, the product form of the glass fiber of the present invention is preferably any one of a chopped strand, a yarn, and a roving. With this, the glass fiber can be used in various applications.

Here, the chopped strand is a fiber obtained by cutting a glass fiber bundle into a predetermined length, the yarn is a continuous glass fiber that is twisted, and the roving is obtained by paralleling a plurality of strands each serving as a glass fiber bundle.

The fiber length and fiber diameter of the chopped strand are not limited, and a fiber length and a fiber diameter adapted to its applications may be selected. In addition, an arbitrary method may be adopted as a method of producing the chopped strand. The glass fiber may be directly turned into a short fiber immediately after a melting step, or may be subjected to cutting with a cutting apparatus in accordance with its applications after having been wound as a long fiber once. In this case, an arbitrary method may be adopted as a cutting method. For example, a peripheral cutting edge cutting apparatus, an inner diameter cutting edge cutting apparatus, or a hammer mill may be used. In addition, the assembled form of the chopped strand is not particularly limited. That is, the glass fibers cut into appropriate lengths may be laminated on a plane in a non-oriented manner and formed with a specific binder, or may be brought into a state of being accumulated three-dimensionally in a non-oriented manner. A glass master batch (GMB) pellet (also referred to as, for example, "resin columnar body" or "LFTP") into which the glass fiber has been incorporated at a high content is also permitted.

As long as a predetermined twist is imparted to the yarn, the magnitude, direction, and the like of the twist are not particularly limited, and an untwisted yarn is also permitted.

In addition, any appearance may be adopted for the roving without a hitch as long as the roving is obtained by paralleling the plurality of strands each serving as a glass fiber bundle to provide a bundle, and winding the bundle in a cylindrical shape, and the diameters of the wound fibers and the number of the paralleled fibers are not limited.

In addition, the glass fiber of the present invention may be utilized in the form of, for example, a continuous strand mat, a bonded mat, a cloth, a tape, a braid cloth, or a milled fiber in addition to the foregoing. In addition, the glass fiber may be turned into a prepreg impregnated with a resin. In addition, with regard to a usage method, forming method, or the like to which the glass fiber is applied, the glass fiber may correspond to, for example, spray-up, hand lay-up, filament winding, injection molding, centrifugal molding, roller forming, or a BMC or SMC method comprising using a match die.

In addition, desired performance can be imparted to the glass fiber of the present invention by applying various surface treatment agents. For example, one kind, or an arbitrary combination of two or more kinds, of a sizing agent, a bundling agent, a coupling agent, a lubricant, an antistatic agent, an emulsifying agent, an emulsion stabilizer, a pH adjuster, an anti-bubbling agent, a colorant, an antioxidant, an antifungal agent, and a stabilizer may be applied in an appropriate amount to the surface of the glass fiber to cover the surface. In addition, any such surface treatment agent or application agent may be a starch-based agent or may be a plastic-based agent.

An acrylic, an epoxy, urethane, a polyester, vinyl acetate, a vinyl acetate-ethylene copolymer, or the like may be appropriately used as, for example, a sizing agent for a FRP.

The glass-fiber-containing composite material of the present invention is obtained by compositing the glass fiber described above with an organic medium, concrete, or mortar.

Here, the organic medium is typified by an organic resin, such as a thermoplastic resin or a thermosetting resin. In addition, the concrete is obtained by mixing cement, sand, gravel, and water, and the mortar is obtained by mixing cement, sand, and water.

With regard to the kind of the organic medium, optimum resins may be appropriately used alone or in combination thereof in accordance with applications, and any such resin may be used in combination with any other structure-reinforcing material, such as a carbon fiber, a ceramic fiber, or a bead material.

In addition, the blending ratios of various components forming the concrete or the mortar, and the kind of the cement are not particularly limited. Fly ash or the like may be added.

The glass fiber of the present invention may be used alone. In, for example, a liquid crystal display apparatus to be utilized as the display apparatus of a liquid crystal television or a personal computer, the glass fiber is suitably used in the application of a liquid crystal spacer to be used for holding an interval between two substrate glasses because the fiber diameter of the glass fiber has stable dimensional accuracy.

Further, the composition for a glass fiber and glass fiber of the present invention can each be recycled. That is, an article comprising the composition for a glass fiber and glass fiber of the present invention may be formed into a fiber shape or various shapes except a fiber, such as a spherical shape and a granular shape, through a remelting step to be used in any other application. The article may be used as, for example, a soil additive, a concrete additive or aggregate, or an asphalt additive.

A method of producing a glass fiber of the present invention may be any production method as long as desired performance can be achieved by forming glass formed of the composition for a glass fiber of the present invention into a fiber shape. Glass fibers having stable and variation-free fiber diameters can be obtained as long as the method of producing a glass fiber is a production method comprising mixing various inorganic glass raw materials, melting the mixture at high temperature, then continuously drawing the molten mixture from a bushing nozzle, and rapidly cooling the drawn product with cooling apparatus, which are arranged near the nozzle so as to sandwich the position of the nozzle therebetween, to adjust a glass fiber diameter, that is, the glass fibers are produced by being drawn as glass long fibers in the directly downward direction of the bushing nozzle. In addition, various production methods, such as a direct forming method (DM method: direct melt method) and an indirect forming method (MM method: marble melt method), may be adopted for the glass long fibers in accordance with their applications and production amount. In the method of producing a glass fiber of the present invention, glass cullet may be used in an appropriate amount in addition to the composition for a glass fiber.

In addition, in the method of producing a glass fiber of the present invention, various organic chemical agents may each be applied as a coating agent to the surface of the glass fiber whose glass fiber diameter has been adjusted by performing the rapid cooling. In this case, a method of applying the coating agent is arbitrary, and its application amount only needs to be adjusted by using an application method, such as a spray method or a roll coating method. With regard to the kind of the coating agent, specifically, the surface may be covered with a sizing agent, an antistatic agent, a surfactant, an antioxidant, a coating-forming agent, a coupling agent, or a lubricant.

Examples of the coupling agent that may be used in the surface treatment include γ-aminopropyltriethoxysilane, N-phenyl-γ-aminopropyltrimethoxysilane, γ-glycidoxypropyltrimethoxysilane, γ-methacryloxypropyltrimethoxysilane, γ-(2-aminoethyl)aminopropyltrimethoxysilane, β-(3,4-epoxycyclohexyl)ethyltrimethoxysilane, N-β-(N-vinylbenzylaminoethyl)-γ-aminopropyltrimethoxysilane hydrochloride, γ-chloropropyltrimethoxysilane, γ-mercaptopropyltrimethoxysilane, and vinyltriethoxysilane. The coupling agents only need to be appropriately selected in accordance with the kind of a resin to be composited with the glass fiber to be used.

In addition, in the method of producing a glass fiber of the present invention, it is preferred that the forming be performed with a bushing apparatus.

For example, a bushing apparatus based on the direct melt method (DM method) is used in the method of producing a glass fiber of the present invention.

Any bushing apparatus may be used as long as the apparatus is an apparatus having desired heat resistance and having a sufficient strength, and is an apparatus having, in part of its vessel, a predetermined opening portion configured to flow molten glass out. The structure of any other site of the bushing apparatus, the presence or absence of an incidental apparatus, and the like are not considered. In addition, the entire dimensions and shape of the bushing apparatus, and its heating system, hole number, hole dimensions, hole shape, nozzle shape, or nozzle number are not particularly limited. In addition, an apparatus formed of any material may be used as long as the apparatus has a predetermined strength. An apparatus formed of a heat-resistant metal comprising platinum is particularly suitable.

In addition, in the method of producing a glass fiber of the present invention, an arbitrary method may be adopted as a method of heating the molten glass that flows into the bushing apparatus, a method of homogenizing the molten glass, or the like, and the flow rate, raw material configuration, and the like of the molten glass are not limited.

In addition, the indirect forming method (MM method: marble melt method) comprising using the bushing apparatus for achieving the production of a small amount of glass fibers may be adopted as the method of producing a glass fiber of the present invention as required.

Further, in the method of producing a glass fiber of the present invention, in particular, a short fiber may be produced by a method comprising: rotating a vessel made of a heat-resistant alloy as required instead of using a bushing that is left at rest, that is, causing the bushing apparatus itself to move to inject the molten glass from a small hole arranged in the wall of the vessel with a centrifugal force; and blowing off the molten glass while heating the molten glass. In addition, as a method except the foregoing, the short fiber may be produced by blowing off the molten glass injected from the bushing apparatus with, for example, steam, compressed air, or flame, or the molten glass may be blown off by mounting the molten glass on a drum and rotating the drum.

In addition, in the method of producing a glass fiber of the present invention, the glass fiber is preferably obtained by forming the molten glass while measuring and controlling the forming temperature Tx of the molten glass to be formed with the bushing apparatus in the range of ±20° C. with respect to a target temperature. With this, fine adjustment of the forming temperature Tx for suppressing a fluctuation in diameter of the glass fiber to be formed can be accurately performed, and hence the forming viscosity of the glass fiber can be stabilized to a high degree.

The measurement and control of the forming temperature Tx may be performed with any measuring means capable of measuring and controlling the forming temperature Tx in the range of ±20° C. with respect to the target temperature. For example, the measurement and control may be performed with a thermocouple, or may be performed by an optical method, such as an optical pyrometer. The measured result may be monitored with, for example, a program at any time, and the addition of a heating and cooling system that may quickly respond to an abrupt increase or decrease in temperature to the bushing apparatus enables high-precision control.

Example 1

A composition for a glass fiber according to Example 1 of the present invention is shown in Table 1.

TABLE 1

| | | No. 1 | No. 2 | No. 3 | No. 4 | No. 5 |
|---|---|---|---|---|---|---|
| $SiO_2$ | wt % | 57.7 | 57.7 | 57.6 | 60.7 | 63.5 |
| $Al_2O_3$ | | 22.0 | 21.5 | 22.0 | 22.0 | 20.5 |
| MgO | | 7.0 | 8.5 | 9.5 | 5.0 | 8.5 |
| CaO | | 10.0 | 9.5 | 8.5 | 12.0 | 0.1 |
| $B_2O_3$ | | 3.0 | 1.0 | 1.5 | — | 4.5 |
| $Na_2O$ | | — | — | 0.1 | — | 0.1 |
| $K_2O$ | | — | — | 0.1 | — | — |
| $TiO_2$ | | — | — | 0.2 | — | 2.5 |
| $ZrO_2$ | | — | 1.5 | — | — | — |
| $CeO_2$ | | 0.3 | — | 0.3 | 0.3 | 0.3 |
| $Fe_2O_3$ | | — | — | 0.2 | — | — |
| $SO_3$ | | — | 0.2 | 0.1 | — | 0.1 |
| Forming temperature Tx | ° C. | 1,345 | 1,341 | 1,330 | 1,402 | 1,430 |
| Liquidus temperature Ty | | 1,217 | 1,236 | 1,208 | 1,315 | 1,347 |
| ΔTxy | | 128 | 105 | 122 | 87 | 83 |
| Elastic modulus E | GPa | 91.4 | 95.1 | 95.3 | 91.8 | 87.0 |
| Linear thermal expansion coefficient α | $\times 10^{-7}/$ ° C. | 42.1 | 43.2 | 43.3 | 42.8 | 36.0 |

The respective glass samples of Examples (Sample No. 1 to Sample No. 3) and Comparative Examples (Sample No. 4 and Sample No. 5) were each produced by the following procedure.

First, predetermined amounts of various glass raw materials were weighed and mixed by using an arbitrary natural raw material and/or an arbitrary chemically formed raw material so that glass composition shown in the table was obtained. Thus, a glass batch was produced. Next, the glass batch was loaded into a platinum-rhodium crucible, and was heated and melted in an air atmosphere at 1,500° C. for 5 hours. In order to obtain homogeneous molten glass, molten glass was stirred with a heat-resistant stirring rod in the midst of the heating and melting.

After that, the molten glass brought into a homogeneous state was poured into a casting mold made of carbon, and was subjected to casting into a predetermined shape, followed by the performance of an annealing operation. Thus, a final glass formed body for measurement was obtained.

The physical properties of the resultant glass were measured by the following procedures.

The forming temperature Tx at which the viscosity of the molten glass corresponded to $10^3$ dPa·s was calculated by the interpolation of a viscosity curve obtained by measuring the respective viscosities a plurality of times on the basis of a platinum sphere pull up method after the formed glass had been loaded into an alumina crucible and reheated to be brought into a melt state.

In addition, the liquidus temperature Ty was determined as described below. Glass powder that had passed through a standard 30-mesh sieve and had remained on a standard 50-mesh sieve (300 µm) was loaded into a vessel made of platinum under a state in which the powder had an appropriate bulk density, and the powder was loaded into an indirect heating-type temperature gradient furnace whose maximum temperature was set to 1,250° C. and left at rest, followed by the performance of a heating operation for 16 hours in an air atmosphere. After that, the test body was removed together with the vessel made of platinum, and was left to cool to room temperature, followed by the specification of the deposition temperature of a crystal with a polarizing microscope.

The temperature difference ΔTxy between the forming temperature Tx and the liquidus temperature Ty was calculated from the values of both the temperatures.

The elastic modulus E was measured for each of both surfaces of a sheet-shaped sample having dimensions measuring 40 mm by 20 mm by 2 mm, which had been polished with a polishing liquid having dispersed therein alumina powder No. 1,200, with a free resonance-type elastic modulus-measuring apparatus (manufactured by Nippon Techno-Plus Co., Ltd.) under a room temperature environment.

The linear thermal expansion coefficient α was measured with a linear thermal expansion coefficient-measuring instrument calibrated by using SRM-731 and SRM-738 of the NIST as standard samples having known linear thermal expansion coefficients. The shown results are each an average linear thermal expansion coefficient measured in the temperature range of from 30° C. to 380° C.

As is apparent from Table 1, Sample No. 1 to Sample No. 3 serving as Examples each had a forming temperature Tx of 1,365° C. or less, and a temperature difference ΔTxy between its forming temperature Tx and liquidus temperature Ty of 90° C. or more. In addition, the elastic modulus E of each of the samples was as high as 90 GPa or more.

Meanwhile, Sample No. 4 serving as Comparative Example had a forming temperature Tx as high as 1,402° C., and a temperature difference ΔTxy between its forming temperature Tx and liquidus temperature Ty of less than 90° C. In addition, Sample No. 5 had a high forming temperature Tx, a small ΔTxy, and an elastic modulus E of less than 90 GPa.

Example 2

Next, the glass fiber and glass-fiber-containing composite material of the present invention are described.

For example, when a composition for a glass fiber having the glass composition of Sample No. 1 of Example 1 is melted, and then a bushing apparatus having a nozzle made of platinum is used, a glass monofilament having a diameter of 3 µm can be continuously formed. Even when the continuous forming is performed, yarn breakage hardly occurs, and hence a glass fiber having a stable fiber diameter can be obtained.

In addition, the bushing apparatus is designed so that a system capable of monitoring the temperature of molten glass in the bushing apparatus corresponding to the forming temperature Tx at any time through thermocouple measurement may operate, and its monitoring temperature width is ±20° C. with respect to a target forming temperature. When the forming temperature reduces, heating is performed so as to redress the reduction, and hence stable production can be performed.

Next, when a silane coupling agent or the like is applied in an appropriate amount to the surface of the glass fiber formed with the above-mentioned bushing apparatus by an immersion method, and is air-dried, a glass fiber having applied thereto the sizing agent is obtained. When a plurality of such glass fibers are bundled and lumped with an organic solvent formed of a polypropylene resin, and the lump is cut into a desired length, an LFTP in which the glass fibers are oriented in the same direction can be obtained.

A glass fiber length can be lengthened by using the LFTP (also referred to as "pellet formed body") thus obtained, and hence a glass-fiber-containing composite material having a high strength can be obtained. When, for example, a sheet-shaped product is evaluated for its bending strength and the like, the product has performance equal to or more than that of a conventional product.

As described above, each of the glass fiber and the glass-fiber-containing composite material each using the composition for a glass fiber of the present invention exhibits excellent performance, and is hence applicable to various fields in the industry.

INDUSTRIAL APPLICABILITY

The glass fiber and the glass-fiber-containing composite material each of which is produced by using the composition for a glass fiber of the present invention can be expected to find use in various applications. For example, in an aircraft-related application, the glass fiber and the composite material may each be used in a base material for an aircraft, an interior material, a vibration-proof material, or the like, and in an on-vehicle-related application, the glass fiber and the composite material may each be used in a damping-reinforcing material, a bumper, an engine under cover, a fender, a roof material, a body, a spoiler, a muffler filter, a dash panel, a radiator, a timing belt, or the like. In addition, in a ship-related application, the glass fiber and the composite material may each be used in a motor boat, a yacht, a fishing boat, or the like, in a construction-civil engineering-building material-related application, the glass fiber and the composite material may each be used in a decorative wall, a luminous ceiling/lighting cover, a front paste cloth, an insect screen, a roll blind, a membrane material for a tent, a backlit signboard, a corrugated plate, flat plate, or folded plate for lighting, a concrete corrosion-preventing or concrete-reinforcing material, an exterior wall-reinforcing material, a coating waterproof material, a smoke-proof hanging wall, a non-combustible transparent partition, a projection screen, a road-reinforcing material, a bathtub, a bath-toilet unit, or the like, and in a leisure- or sports-related application, the glass fiber and the composite material may each be used in a fishing rod, a tennis racket, a golf club, a ski, a helmet, or the like. In addition, in an electronic equipment-related application, the glass fiber and the composite material may each be used in a printed wiring board, an insulating plate, a terminal board, a substrate for an IC, an electronic equipment-housing material, a packaging material for an electronic part, an optical equipment-housing material, a packaging material for an optical part, an insulating support, or the like, in an industrial facility-related application, the glass fiber and the composite material may each be used in a windmill blade, a glass filter bag, a jacketing material for a non-combustible heat-insulating material, a reinforcing material for a resinoid wheel, an aluminum filtration filter, or the like, and in an agriculture-related application, the glass fiber and the composite material may each be used in a plastic greenhouse, an agricultural pole, a silo tank, or the like. In addition, the above-mentioned glass-fiber-containing composite material may also be used as a reinforcing material for a known fiber-reinforced composite material.

The invention claimed is:

1. A composition for a glass fiber, comprising, as a glass composition expressed as a mass percent in terms of oxide, 50% to 70% of $SiO_2$, 21% to 25% of $Al_2O_3$, 3% to 13% of MgO, 8% to 15% of CaO, and 0.5% to 5% of $B_2O_3$.

2. The composition for a glass fiber according to claim 1, wherein the composition has a temperature difference $\Delta Txy$ between a forming temperature Tx and a liquidus temperature Ty of 90° C. or more.

3. The composition for a glass fiber according to claim 1, wherein the composition has a forming temperature Tx of 1,365° C. or less.

4. The composition for a glass fiber according to claim 1, wherein the composition has an elastic modulus E of 90 GPa or more.

5. The composition for a glass fiber according to claim 1, wherein the composition has a linear thermal expansion coefficient $\alpha$ of $45 \times 10^{-7}$° C. or less.

6. A glass fiber, comprising 95 mass % or more of glass formed of the composition for a glass fiber of claim 1 in terms of solid content.

7. The glass fiber according to claim 6, wherein a product form of the glass fiber comprises any one of a chopped strand, a yarn, and a roving.

8. A glass-fiber-containing composite material, which is obtained by compositing the glass fiber of claim 6 with an organic medium, concrete, or mortar.

9. A method of producing a glass fiber, comprising forming glass formed of the composition for a glass fiber of claim 1 into a fiber shape.

10. The method of producing a glass fiber according to claim 9, wherein the forming is performed with a bushing apparatus.

11. The method of producing a glass fiber according to claim 9, wherein the forming is performed while a forming temperature Tx is measured and controlled in a range of ±20° C. with respect to a target temperature.

* * * * *